May 12, 1925.
E. A. SPERRY ET AL
DRAG RUDDER FOR GRAVITY BOMBS
Filed June 4, 1921     2 Sheets-Sheet 1
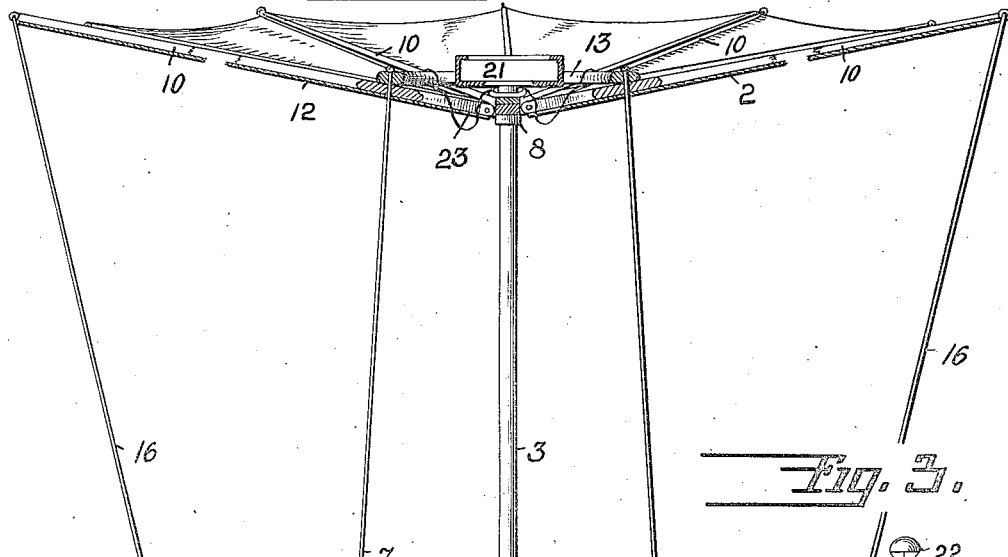
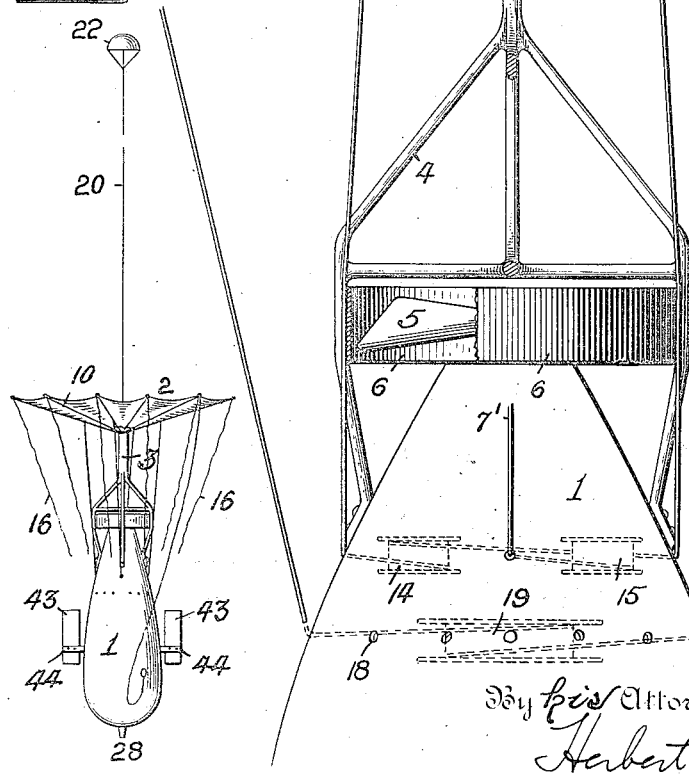
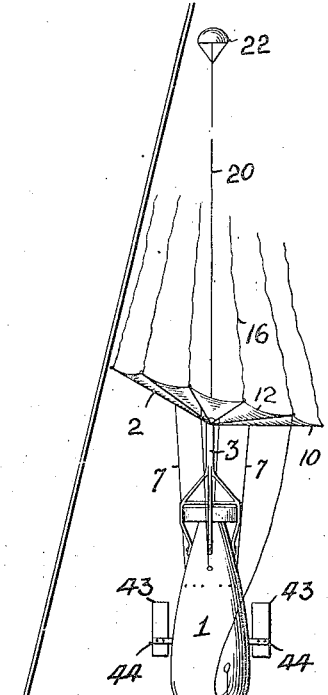
Inventor
Elmer A Sperry &
Thomas H Phillips, Jr.
By his Attorney
Herbert H Thompson May 12, 1925.
E. A. SPERRY ET AL
1,537,713
DRAG RUDDER FOR GRAVITY BOMBS
Filed June 4, 1921
2 Sheets-Sheet 2
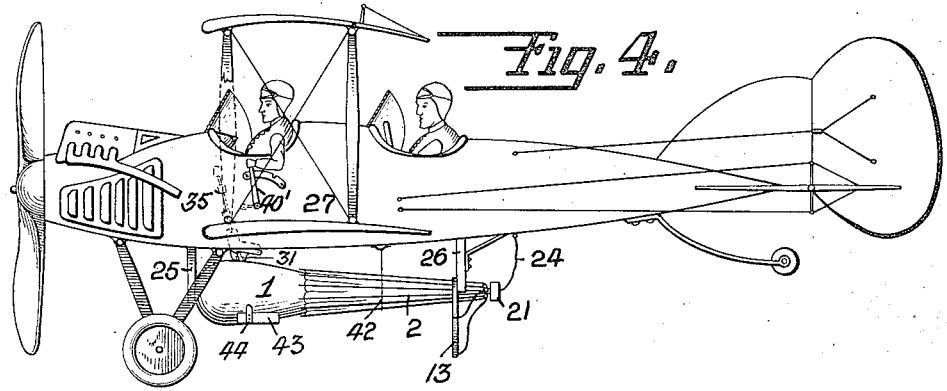
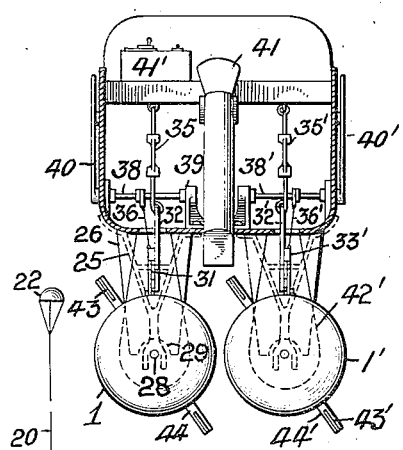
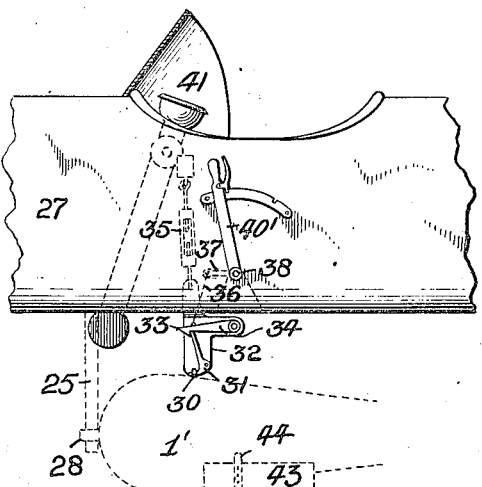
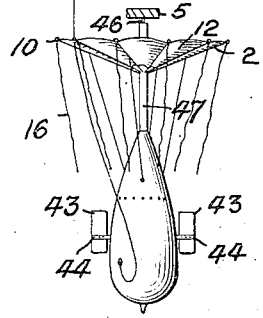
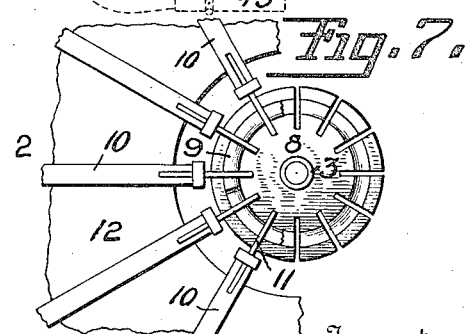
Inventor
Elmer A. Sperry &
Thomas H. Phillips, Jr.
By his Attorney
Herbert H. Thompson Patented May 12, 1925.

1,537,713

UNITED STATES PATENT OFFICE.

ELMER A. SPERRY, OF BROOKLYN, NEW YORK, AND THOMAS H. PHILLIPS, JR., OF FORT MYERS, FLORIDA; SAID PHILLIPS, JR., ASSIGNOR TO SAID SPERRY.

DRAG RUDDER FOR GRAVITY BOMBS.

Application filed June 4, 1921. Serial No. 474,909.

*To all whom it may concern:*

Be it known that we, ELMER A. SPERRY and THOMAS H. PHILLIPS, Jr., citizens of the United States of America, residing, respectively, at 1505 Albemarle Road, Brooklyn, New York, and Fort Myers, Florida, Box 111, have invented certain new and useful Improvements in Drag Rudders for Gravity Bombs, of which the following is a specification.

This invention relates to the dropping of bombs and particularly to bombs provided with means for changing their path of descent, such as disclosed in our application Patent No. 1,384,868 granted July 19, 1921, for dirigible gravity bomb, of which the present application is a continuation in part. The chief object of the invention of this application is the provision of an efficient type of drag rudder or parachute element for retarding the descent of the bomb and aiding in the accurate dropping of the latter. When a parachute of the ordinary type, comprising a downwardly facing cup-like member, is employed to retard the descent of the bomb, the latter veers first one way and then another so that accurate dropping of the bomb is impossible, especially from a moving aircraft. We have discovered that by making the parachute or drag rudder in the form of an inverted cone, the apex thereof being below the base portion, the bomb will drop straight and maintain its perpendicular position even when dropped from a moving craft. The speed of descent of the bomb can at the same time be reduced to any desired extent by varying the diameter of the drag rudder. The latter may also be tilted at the will of a distant operator, as described in our above-mentioned patent, to change the path of descent of the bomb.

Another object is to provide means for supporting the bomb on an aircraft with the drag rudder in folded position and for releasing the bomb from the aircraft. Other objects and advantages will become apparent as the description of the invention is hereinafter developed.

Referring to the drawings where we have shown what we now consider to be the preferred form of our invention:

Fig. 1 is a fragmentary elevation, partly in section, of the upper portion of the bomb showing our improved type of drag rudder or parachute element.

Fig. 2 is a view on a smaller scale of the bomb after launching and showing the drag rudder in open position.

Fig. 3 is a view similar to Fig. 2 but showing the drag rudder tilted to change the path of descent of the bomb.

Figs. 4 and 5 are respectively an elevation and transverse section of an aeroplane showing a plurality of bombs attached thereto.

Fig. 6 is a fragmentary elevation on a larger scale of a part of the structure shown in Fig. 4.

Fig. 7 is a fragmentary detail plan view illustrating one form of means which may be employed to secure the ribs of the drag rudder to the bomb.

Fig. 8 is an elevation similar to Fig. 2 but showing a slightly modified form of bomb.

The bomb is shown at 1 and the drag rudder or parachute element at 2. The latter is non-rotatably secured to the bomb by means of a rod or stem 3. The element 2 is termed a drag rudder for the reason that it serves both to retard the descent of the bomb and to steer the latter. We have found that by making said drag rudder in the form of an inverted cone, as shown, certain important advantages over the ordinary downwardly facing cup-like parachute are obtained. As has been pointed out above, the accurate dropping of a bomb, especially from a moving aircraft, is impossible when a parachute of the ordinary type is employed, since such a parachute causes the bomb to veer first one way and then another, like a kite without a tail. With our inverted cone form of drag rudder, however, the downwardly directed apex cuts through the air and maintains the bomb in perpendicular position even when dropped from a moving craft. Since the drag rudder is V-shaped in cross-section it may be said to present a dihedral angle of attack to the atmosphere. Not only does this type of drag rudder cause the bomb to drop perpendicularly but also it retards the descent of the bomb to an extent depending upon the diameter of the rudder. Furthermore, by tilting our improved form of drag rudder the path of descent of the bomb may be changed at will. Thus if said rudder, which is shown in neutral position in Fig. 2, is deflected to a position as illustrated in Fig. 3, the bomb will drift to the right. In short, if the element 2 is deflected in any direction, the bomb will drift in the direction in which the axis of said element moves. It should be noted that the central stem or post 3 aids in maintaining the parachute 2 and bomb 1 rigidly aligned and thus gives a better rudder action.

The construction of the drag rudder 2 and specific connections between it and the bomb are illustrated in Figs. 1 and 7. The stem 3 terminates in a frame 4 which clears the windwheel 5 and is riveted or otherwise secured to the upper portion of the bomb. The windwheel aforementioned performs certain functions which have been fully described in our aforesaid patent. A hollow cylindrical guard 6 surrounds said wheel to protect the latter and to prevent snarling of the operating cables 7, 7'. A two part radially slit collar 8 is secured to the stem 3 adjacent the upper end thereof, a split ring 9 being clamped between the two portions of said collar. A plurality of ribs 10 are provided, each of said ribs having a recessed extension 11 adapted to seat in a corresponding one of the slits in the collar, and to receive therethrough the ring 9. Cloth or fabric 12 secured to the under or inner side of ribs 10 completes the structure of the drag rudder proper. The cables 7, 7' are connected to a ring 13 which engages the upper side of said drag rudder, so that by tilting said ring the drag rudder will be tilted and the path of descent of the bomb may be changed. Said cables pass through suitable openings in ribs 10, as shown, and also through suitable openings in the bomb. Cable 7 is wound around a drum 14 within the bomb and is connected to ring 13 at diametrically opposite points on the latter. Similarly the cable 7' is wound around a drum 15 within the bomb and is connected to the drag rudder at two opposed points each 90° from the connections of cable 7, as is shown clearly in our patent aforesaid. The means whereby the drums 14 and 15 may be actuated at the will of a distant operator to tilt ring 13 and thus control the path of descent of the bomb is fully disclosed in said patent and will hence not be described here.

Cords 16 each connected at one end to the outer end of a corresponding one of ribs 10 are adapted to extend through openings 18 Fig. 1 in the bomb when the drag rudder is folded as indicated in Fig. 4 and to be wound on a drum or reel 19, for the purpose of spinning up a gyroscope within the bomb when the drag rudder opens, as is fully described in our aforesaid patent. An antenna 20 for receiving wireless impulses is normally coiled within a container 21 of insulating material carried by the upper end of the post 3, one end of said antenna being secured to said container and the other to a small parachute 22 for sustaining the antenna. An opening 23 is provided at the center of the drag rudder for permitting air to pass through the latter to aid in the release of the parachute 22 from its container. The parachute 22 has connected thereto a cord, such as twine 24, which is connected at its other end to the aeroplane as indicated in Fig. 4. When the bomb is launched the cord 24 becomes taut and pulls the parachute 22 from the container 21 and the antenna will unwind. When the latter is completely unwound the cord 24 breaks and the antenna is sustained by the parachute as indicated in Figs. 2 and 3.

A suitable manner of releasably carrying a bomb or plurality of bombs on an aeroplane is illustrated in Figs. 4, 5 and 6. A pair of brackets 25, 26 are secured to the fuselage 27 on the bottom thereof. The bracket 25 is forked at its lower end to receive a pin 28 secured to the body portion of the bomb. The other bracket 26 is provided at its lower end with an arc-shaped notch 29 to receive the folded drag rudder 2. The brackets 25, 26 are preferably so arranged that the center of gravity of the bomb normally lies in the same vertical plane as the center of gravity of the aeroplane. In order to hold the bomb in seated position, mechanism constructed substantially as follows may be employed.

The body portion of the bomb is provided with an eye 30 adapted to receive the hook-shaped end of a lever 31 pivoted on a base 32. The long arm of said lever 31 is adapted to seat against a shoulder 33 of an arm 34 also pivoted on said base 32. The upper end of said base may be connected to the fuselage 27 by means of a turnbuckle 35. By tightening said turnbuckle the bomb will be held firmly in the brackets 25, 26. The mechanism for releasing the arm 34 and consequently the bomb may assume the form clearly illustrated in Figs. 5 and 6. The arm 34 is connected by a cord or wire 36 to the arm 37 secured to a rock shaft 38. The latter is journaled at 39 on the fuselage and projects through one side of the latter. The projecting end of said shaft 38 has secured thereto a manually operable member 40 adapted to be grasped and operated by the bombing operator or observer. In order to release the bomb the handle 40 is drawn rearwardly to raise the arm 34. The hooked end of lever 31 will disengage the eye 30 and the bomb is free to drop.

Any desired bomb sight 41 may be employed for determining the proper time at which the bomb should be released. A sending instrument for controlling by wireless the path of descent of the bomb may be located as indicated at 41' in Fig. 5 so as to be easily accessible to the observer. As many additional bombs may be carried by the aeroplane as desired. Thus we have illustrated an additional one 1' carried by the aeroplane and releasable by mechanism 40', etc., similar to that for the bomb previously described.

If desirable a cord 42 may be passed under the drag rudder 2, when the latter is in the position indicated in Figs. 4 and 5, and secured to the aeroplane as shown. This cord together with bracket 26 will aid in holding the drag rudder in normally closed position. The cord 42 while strong enough to perform the above mentioned function is adapted to be broken by the weight of the bomb when the latter is released at 30. The other bomb shown may be provided with a similar cord 42'.

Control planes 43 oscillatable about an axis normal to the axis of the bomb are provided for stabilizing the latter in azimuth. These planes are each secured to a corresponding one of shafts 44 which extend into the bomb and are operated through suitable mechanism (not shown) to maintain the bomb stabilized in azimuth.

As an example of the numerous changes which may be made in the details of the bomb structure which we have devised, a slightly modified form of bomb is shown in Fig. 8. In this modification the windwheel 5 is located above the drag rudder 2. The shaft 46 of said windwheel passes through a hollow tubular post 47 which serves to secure the drag rudder to the bomb. The antenna 20 in this figure is connected adjacent the outer end of one of the ribs 10 of the drag rudder. In this form of bomb the provision of a cylindrical guard to prevent the entangling of the operating cables with the windwheel is unecessary.

In accordance with the provisions of the patent statutes, we have herein described the principle of operation of our invention, together with the apparatus, which we now consider to represent the best embodiment thereof, but we desire to have it understood that the apparatus shown is only illustrative and that the invention can be carried out by other means. Also, while it is designed to use the various features and elements in the combination and relations described, some of these may be altered and others omitted without interfering with the more general results outlined, and the invention extends to such use.

Having described our invention, what we claim and desire to secure by Letters Patent is:

1. A parachute having its apex at its lowest point in the open position and at its highest point in the folded position.

2. A parachute having means permitting it to be opened in the form of an inverted cone during the launching operation and closed in the form of an upright cone.

3. A parachute having means permitting it to be opened during the launching operation in the form of a member having its apex at the lowest point thereof, and closed in the form of a member having its apex at the highest point thereof.

4. A parachute having a ring fixed thereto so that any movement of said ring causes corresponding movement of said parachute, and means connected to said ring for tilting the same to control the direction of travel of said parachute.

5. A parachute having means permitting it to be opened in the form of an inverted cone, a ring fixed to said parachute, means connected to said ring whereby said ring and parachute may be tilted to control the movement of said parachute.

6. In combination, a parachute adapted to be connected to an element, a rigid post connecting said parachute to said element, said parachute being pivotally connected to said post, a ring fixed to said parachute so that any movement of said ring causes corresponding movement of said parachute, and means connected to said ring for tilting the same to control the direction of travel of said parachute.

7. A parachute adapted to be pivotally mounted on a rigid post, a ring fixed to said parachute so that any movement of said ring causes corresponding movement of said parachute, and means connected to said ring for tilting the same to control its direction of travel.

In testimony whereof we have affixed our signatures.

ELMER A. SPERRY.
THOMAS H. PHILLIPS, Jr.